Jan. 4, 1927.  
T. AOKI  
1,613,262  
OPTICAL TORSION METER  
Filed July 30, 1924   2 Sheets-Sheet 1
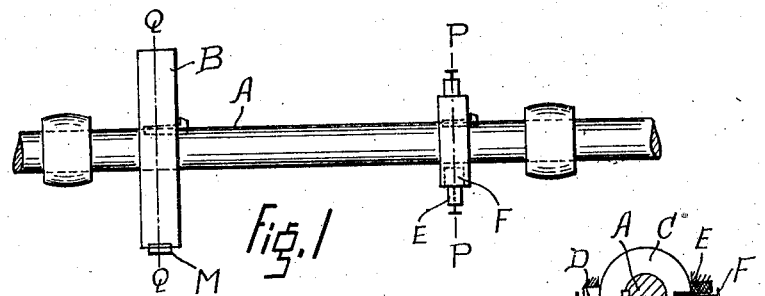
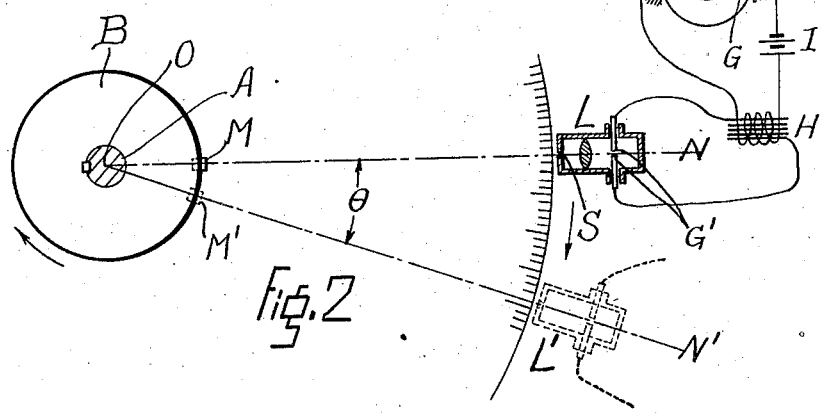
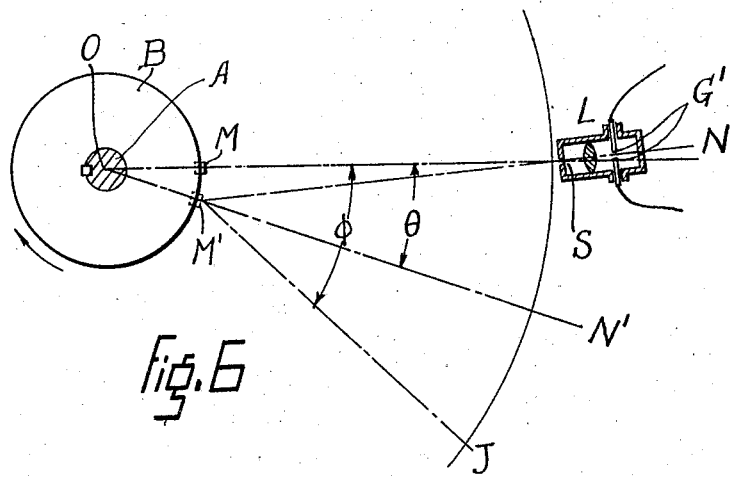
Inventor
TAMOTSU AOKI
By his Attorneys Richards & Geier Jan. 4, 1927. 1,613,262
T. AOKI
OPTICAL TORSION METER
Filed July 30, 1924  2 Sheets-Sheet 2
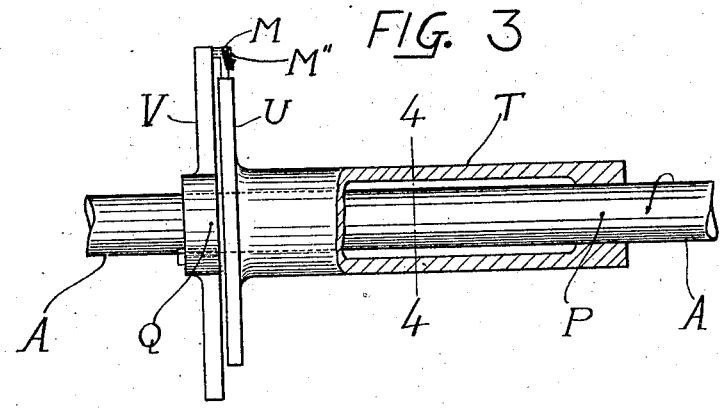
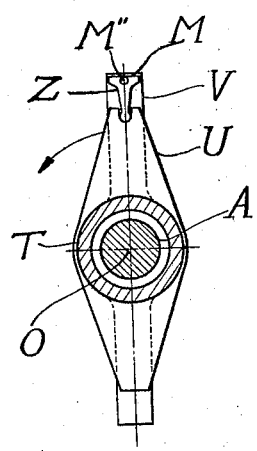
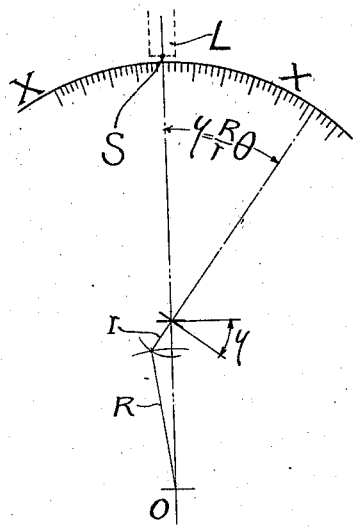
Inventor
TAMOTSU AOKI
By his Attorneys Richards & Geier Patented Jan. 4, 1927.

1,613,262

UNITED STATES PATENT OFFICE.

TAMOTSU AOKI, OF TOKYO, JAPAN.

OPTICAL TORSION METER.

Application filed July 30, 1924, Serial No. 729,065, and in Japan February 13, 1924.

This invention relates to improvements in an optical torsion meter, which consists of a mirror and illuminating and observing devices. The mirror is arranged in a portion of the shaft and a controlling device of the illuminating system is provided in another portion of the shaft. The whole system is so arranged that the light illuminates the mirror only in a certain position of the latter under no load running of the shaft. When the shaft is twisted, however, the refracted ray is deflected by a certain angle corresponding to the torsion of the shaft so that the deflection of the reflected ray in actual condition from the initial or no load condition gives the required torsion of the shaft.

In the accompanying drawings—

Fig. 1 shows a diagrammatical plan view of the shaft and its accessories according to the invention;

Fig. 2 is a diagrammatical arrangement according to the invention;

Fig. 3 is a modification of the torsion meter of the invention, suitable for the case in which the amount of torsion is small and in which the circuit making the electrical sparks is omitted;

Fig. 4 is a sectional view along the line 4—4 in Fig. 3, looking from the right;

Fig. 5 is a diagram illustrating the action and the magnification of the reading of the modification shown by Fig. 3 and Fig. 6 is a view similar to Fig. 2 showing a different arrangement according to the invention.

In the drawings, A is a shaft the torsion of which is to be measured. P P and Q Q are two sections in the shaft at a certain distance apart, the relative torsion of which is to be measured.

In the point Q, is fixed an arm or a disc B, to the ends or the periphery of which a small mirror M is attached. Also, P is provided with an electric switch. This switch consists of a drum or disc C fixed to the shaft and brushes D and E supported independently of the shaft A. The disc C is an electric conductor and provided with a small non-conducting piece G studded therein. The brush D is a conductor and may be in a form of a spring brush or any other type, while the other brush E is of a non-conducting material and is provided with a thin conducting piece F. I is a source of electricity and H is an induction coil.

The illuminating device L shown in the figure comprises a tube or box provided with terminals G', G', and the light from the electric spark generated between these terminals is collected by a lens so that a beam of light is emitted through a circular hole or a slit S in the fore end of the cylinder.

The spark terminals G', G' are connected to the terminals of the secondary winding of the induction coil H, one terminal of the primary coil of which is connected to a source of electricity I and the said conductor F of the brush E while the other terminal thereof is connected to the brush D. Thus, when the shaft A rotates and the non-conducting piece G contacts with the conductor F of the brush E, the primary winding of the induction coil H is cut off from the source of electricity I and thereby the gap between the terminals G', G' is sparked. When the shaft rotates with no load, the mirror M on the shaft is in a position directly opposite to the slit S at the instant of sparking. Therefore, the ray coming through the slit S upon the mirror M is reflected in a direction M, N, and thus a reflecting ray towards M, N can be observed in the direction M, N. When, however, the shaft rotates with a certain load, it is distorted and the position of mirror M comes to a position M' at an instant of sparking. Therefore, a reflecting ray can be no more observed in the direction M, N. If the illuminating device L is transferred to a position L' as shown, then again the reflecting ray can be observed. That is, an angle NON' which is the angle of displacement of the illuminating device L around the center of shaft, is equal to the torsional angle of the shaft under the load.

Instead of displacing the illuminating device L from the original position to a new position L' in which the reflecting ray is observed, the device may be deflected or trained around the vertical axis through the slit S until the ray emitting therethrough is projected on the mirror now in M' position. Then the ray is reflected in the direction M'J as shown. To observe such reflected ray, a curved scale of semi-transparent glass and the like may be used. If the angle of $NON' = \theta$, and the angle of $SM'J = \zeta$, then there is the following relation between $\theta$ and $\zeta$, $$\zeta = 2\theta \left(1 + \frac{OM}{MS}\right)$$

That is, the angle of reflection $\zeta$ is over twice the torsional angle $\theta$ and therefore one more accurate measuring of torsion can be obtained by measuring the angle $\zeta$ than the direct measurement of $\theta$ as above explained.

Instead of using an induction coil H for the formation of spark, any other convenient means such as, for instance, neon lamp the after glow of which is very small may be employed. In this case, the lamp is situated in a position GG in the example shown. Also the disc C and brushes D and E may be suitably altered so that when the shaft rotates with no load the light illuminates the mirror at an instant when the latter comes in a position shown by M. Such alterations may easily be made by any one in this line.

Figs. 3 to 5 show an example which is rather suitable in the case where the amount of torsion of the shaft is very small. In these figures, T is a tube which is fixed to a point P on the shaft A. The free end of this tube T is provided with an arm U. V is another arm which is fixed to the shaft at point Q. The torsional angle of the shaft between the points P and Q are now to be measured. The arm V is provided with a pin M″ by which a T shaped member Z is pivoted. A mirror M is attached to the upper face of the member Z. The lower end of the member Z engages with a notch or a groove in the upper end of the said arm U. Thus, when the shaft A rotates under load in a direction shown by an arrow in Fig. 3, the arm U moves in the direction shown by an arrow in Fig. 4 relative to the arm V. Therefore, the T shaped member Z is inclined around the pin M″. Instead of making the member Z of T shape, it may be made L shaped with equal facility.

Now let R be the radius of arm V, and $r$, the length of the web of the T shaped member, then the torsional angle $\theta$ and the angle of inclination of mirror $\zeta$ is expressed by $$\zeta = \frac{R}{r}\theta, \text{ or } \theta = \frac{r}{R}\zeta$$

In the point P, a controlling means of the intermittently illuminating device is provided similarly as in the example shown in Figs. 1 and 2, and the angle $\zeta$ corresponding to angle $\theta$ can be measured as in the first example above explained in connection with Fig. 2 by displacing the illuminating and observing device L along the arc XX which has its center in O; or by the deflecting angle of the reflected ray in the same way as just described in the first example.

In the foregoing explanations, it was assumed that the illuminating device stands just opposite to the mirror that is, the ray projects normally upon the mirror in the no load condition, but it may be easily understood that such restriction is of no importance and any initial relative position between the two may be selected.

I claim:

1. In an optical torsion meter, the combination with a shaft, the torsion of a portion of which is to be measured; of an illuminating means, a controlling device for said means fixed to the shaft at one extremity of said portion, and a mirror carried by the shaft at the other extremity of said portion to be measured, the relative positions of said mirror and illuminating means being such that the ray from the latter illuminates the mirror under a no-load running of the shaft whereby the angle of torsion of the shaft can be measured by the angle of deflection of the ray from said illuminating means until said ray illuminates the mirror when the shaft rotates under load.

2. An optical torsion meter in accordance with claim 1, characterized by the fact that the illuminating means projects light upon the mirror only when the latter comes directly opposite to the former under no-load running of the shaft, while under loaded condition of the shaft the illuminating means is deflected until it illuminates the mirror whereby the torsional angle of the shaft may be measured.

3. An optical torsion meter in accordance with claim 1, characterized by a sleeve surrounding said shaft with one end of the sleeve fixed to the shaft at the first named extremity of said portion to be measured, an arm carried by the other end of the sleeve adjacent the other extremity to be measured, a second arm carried by the shaft adjacent the first named arm, and a member pivoted to said arm and carrying said mirror and having a portion engageable with the first named arm.

In testimony whereof I affix my signature.

TAMOTSU AOKI.